(12) United States Patent
Schott et al.

(10) Patent No.: US 11,105,653 B2
(45) Date of Patent: Aug. 31, 2021

(54) SYSTEM FOR GENERATING MAP WITH INSTRUCTIONAL TIPS

(71) Applicant: Caterpillar Inc., Deerfield, IL (US)

(72) Inventors: Megan Schott, Peoria, IL (US); Rodney L. Menold, Hanna City, IL (US); David C. Janik, Ottawa, IL (US); Andrew J. de Haseth, Durham (GB)

(73) Assignee: Caterpillar Inc., Peoria, IL (US)

( * ) Notice: Subject to any disclaimer, the term of this patent is extended or adjusted under 35 U.S.C. 154(b) by 277 days.

(21) Appl. No.: 16/267,947

(22) Filed: Feb. 5, 2019

(65) Prior Publication Data

US 2020/0249045 A1  Aug. 6, 2020

(51) Int. Cl.
| | |
|---|---|
| *G01C 21/36* | (2006.01) |
| *G06F 16/29* | (2019.01) |
| *E02F 9/26* | (2006.01) |
| *G07C 5/08* | (2006.01) |

(52) U.S. Cl.
CPC ............ *G01C 21/367* (2013.01); *E02F 9/262* (2013.01); *E02F 9/265* (2013.01); *G06F 16/29* (2019.01); *G07C 5/085* (2013.01)

(58) Field of Classification Search
CPC ........ G01C 21/367; G06F 16/29; E02F 9/262; E02F 9/265; E02F 9/267; G07C 5/085; G07C 9/2054

See application file for complete search history.

(56) References Cited

U.S. PATENT DOCUMENTS

| | | | |
|---|---|---|---|
| 5,101,627 | A | 4/1992 | Fujii et al. |
| 6,645,318 | B2 | 11/2003 | Takahashi et al. |
| 7,424,414 | B2 | 9/2008 | Craft |
| 8,498,808 | B2 | 7/2013 | Vavrus et al. |
| 8,554,468 | B2 | 10/2013 | Bullock |
| 8,682,575 | B2 | 3/2014 | Sakashita |
| 9,000,706 | B2 | 4/2015 | Dontha et al. |
| 9,227,660 | B1 | 1/2016 | Bebernes et al. |

(Continued)

FOREIGN PATENT DOCUMENTS

| | | |
|---|---|---|
| GB | 2443645 A | 5/2008 |
| KR | 10-2016-0121038 A | 10/2016 |
| KR | 1020180095261 | 8/2018 |

*Primary Examiner* — Michael V Kerrigan
(74) *Attorney, Agent, or Firm* — Leydig, Voit & Mayer, Ltd.

(57) ABSTRACT

A system for generating a map based upon a plurality of operations each including at least one quantitatively measurable task. The system includes a ground engaging drive mechanism, an operating sensor, a position sensor, a visual image display device, and a controller. The controller compares a first operating characteristic to a first operating range, and stores a first failed task and current machine position upon the first operating characteristic of the machine being outside of the first operating range. The controller also compares a second operating characteristic to a second operating range, and stores a second failed task and the current machine position upon the second operating characteristic of the machine being outside of the second operating range. A map of the machine path is displayed including each failed task and its associated machine position while performing the failed task.

20 Claims, 10 Drawing Sheets

(56) References Cited

U.S. PATENT DOCUMENTS

| | | |
|---|---|---|
| 9,441,348 B1 | 9/2016 | Alig et al. |
| 9,805,618 B2 | 10/2017 | Cai et al. |
| 2001/0001844 A1 | 5/2001 | Moore et al. |
| 2005/0246040 A1 | 11/2005 | Harkavi et al. |
| 2007/0192173 A1 | 8/2007 | Moughler et al. |
| 2009/0132131 A1 | 5/2009 | Takeda et al. |
| 2009/0326768 A1 | 12/2009 | Shull |
| 2010/0184005 A1 | 7/2010 | Eklund et al. |
| 2012/0135382 A1 | 5/2012 | Winston et al. |
| 2012/0233086 A1 | 9/2012 | Shin |
| 2014/0067092 A1 | 3/2014 | Cesur et al. |
| 2015/0047609 A1 | 2/2015 | Kleczewski et al. |
| 2016/0196762 A1 | 7/2016 | Cai et al. |
| 2016/0196769 A1 | 7/2016 | Fletcher et al. |
| 2016/0232816 A1 | 8/2016 | Cai et al. |
| 2016/0326726 A1 * | 11/2016 | Koga .................. E02F 9/267 |
| 2017/0220044 A1 | 8/2017 | Sakai et al. |
| 2017/0255894 A1 | 9/2017 | Witkin et al. |
| 2018/0066958 A1 | 3/2018 | Choi et al. |
| 2018/0209120 A1 | 7/2018 | Gentle et al. |
| 2018/0258610 A1 | 9/2018 | Elkins |

\* cited by examiner

SYSTEM FOR GENERATING MAP WITH INSTRUCTIONAL TIPS

TECHNICAL FIELD

This disclosure relates generally to a system for generating a map with instructional tips and, more particularly, to a system and method for evaluating quantitatively measurable machine tasks and generating a map displaying the tasks.

BACKGROUND

Machines such as, for example, wheel loaders, haul trucks, track-type tractors, motor graders, dozers, and other mobile machines are used to perform a variety of operations associated with an industry such as mining, farming, construction, transportation, or any other industry. It may take a significant amount of training before an operator may be characterized as an expert or even an intermediate operator.

Machine operators are often trained in computer-based simulators and perform on-machine training exercises prior to performing actual work-related operations. While these methods may provide a basic level of operational exposure, they may not provide an environment that completely prepares the operator for actual "real-world" work experiences associated with a job site. Thus, many inexperienced machine operators may require additional on-the-job training in certain areas associated with machine operation. Additionally, many experienced machine operators may require supplemental training for certain operational skills and/or new techniques associated with one or more machines. Thus, a system for accurately evaluating the performance of the machine operator and providing feedback on a mapping system may be desirable.

U.S. Pat. No. 8,682,575 discloses method of operating a navigation system in an off-road mode. A waypoint is set and displayed and a plurality of "breadcrumbs" are dropped or set as the vehicle travels towards the next waypoint. The breadcrumbs are also displayed on a display within the vehicle. As a result, a map or visual record of the path of the vehicle is stored and displayed.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for generating a map based upon a plurality of operations performed by a machine is provided with each operation including at least one quantitatively measurable task. The system includes a ground engaging drive mechanism, an operating sensor, a position sensor, a visual image display device, and a controller. The ground engaging drive mechanism is operatively connected to the machine to propel the machine about a path, the operating sensor is operatively associated with the machine and configured to determine a first operating characteristic of the machine, and the position sensor is operatively associated with the machine and configured to determine a position of the machine. The controller is configured to store a first operating range for a first quantitatively measurable task, store a second operating range for a second quantitatively measurable task, determine a current machine position of the machine based upon the position sensor, determine the first operating characteristic of the machine based upon the operating sensor as the machine is propelled about the path to perform operations, compare the first operating characteristic to the first operating range, and store an identification of a first failed task together with the current machine position upon the first operating characteristic of the machine being outside of the first operating range. The controller is further configured to determine a second operating characteristic of the machine as the machine is propelled about the path to perform the operations, compare the second operating characteristic to the second operating range, store an identification of a second failed task together with the current machine position upon the second operating characteristic of the machine being outside of the second operating range, and generate and display a map of the path of the machine on the visual image display device, the map including each failed task and its associated machine position while performing the failed task.

In another aspect, a method of generating a map based upon a plurality of operations performed by a machine is provided with each operation including at least one quantitatively measurable task. The method includes storing a first operating range for a first quantitatively measurable task, storing a second operating range for a second quantitatively measurable task, determining a current machine position of the machine based upon a position sensor operatively associated with the machine, determining a first operating characteristic of the machine based upon an operating sensor operatively associated with the machine as the machine is propelled about a path by a ground engaging drive mechanism operatively connected to the machine to perform operations, comparing the first operating characteristic to the first operating range, and storing an identification of a first failed task together with the current machine position upon the first operating characteristic of the machine being outside of the first operating range. The method further includes determining a second operating characteristic of the machine based as the machine is propelled about the path to perform the operations, comparing the second operating characteristic to the second operating range, storing an identification of a second failed task together with the current machine position upon the second operating characteristic of the machine being outside of the second operating range, and generating and displaying a map of the path of the machine on a visual image display device, the map including each failed task and its associated machine position while performing the failed task.

In still another aspect, a machine includes a ground engaging drive mechanism, an operating sensor, a position sensor, a visual image display device, and a controller. The ground engaging drive mechanism is operatively connected to the machine to propel the machine about a path, the operating sensor is operatively associated with the machine and configured to determine a first operating characteristic of the machine, and the position sensor is operatively associated with the machine and configured to determine a position of the machine. The controller is configured to store a first operating range for a first quantitatively measurable task, store a second operating range for a second quantitatively measurable task, determine a current machine position of the machine based upon the position sensor, determine the first operating characteristic of the machine based upon the operating sensor as the machine is propelled about the path to perform operations, compare the first operating characteristic to the first operating range, and store an identification of a first failed task together with the current machine position upon the first operating characteristic of the machine being outside of the first operating range. The controller is further configured to determine a second operating characteristic of the machine as the machine is propelled about the path to perform the operations, compare the second operating characteristic to the second operating range, store an identification of a second failed task together with the current machine position upon the second operating characteristic of the machine being outside of the second operating range, and generate and display a map of the path of the machine on the visual image display device, the map including each failed task and its associated machine position while performing the failed task.

DETAILED DESCRIPTION

Figure 1:
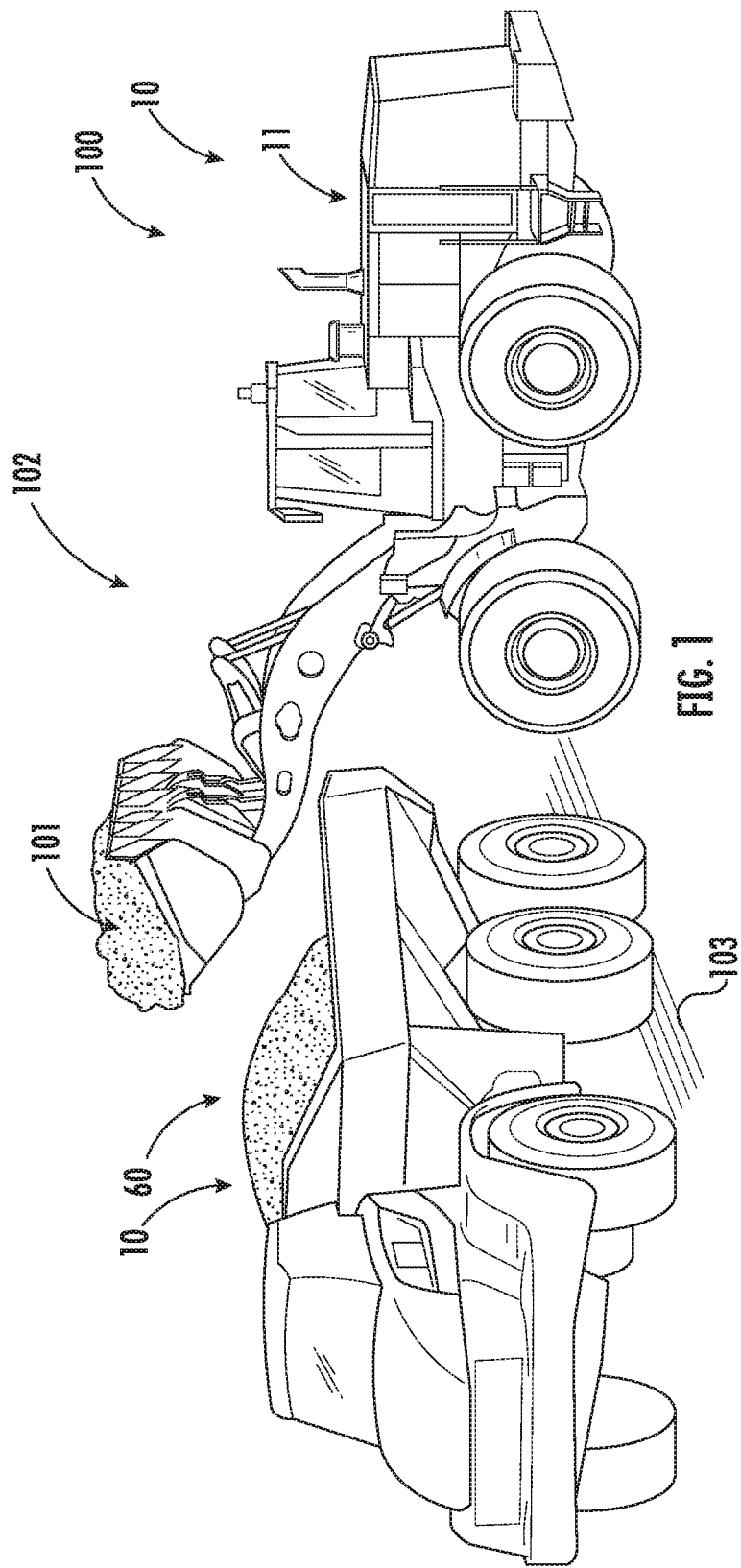
FIG. 1 depicts a schematic illustration of a portion of a work site at which a plurality of machines incorporating the principles disclosed herein may be used.

FIG. 1 illustrates a portion of an exemplary work site 100 at which a plurality of mobile machines 10 may operate to perform material moving operations. The work site 100 may include, for example, a mine site, a landfill, a quarry, a construction site, a road work site, or any other type of work site. The machines 10 may perform any of a plurality of desired operations at work site 100, and such operations may require the machine to generally traverse the work site 100. As depicted, the work site 100 includes a wheel loader 11 used to load material 101 onto a haul truck such as articulated truck 60 at a truck loading location 102. The wheel loader 11 may move about the work site 100 from one or more loading locations (not shown) to the truck loading location 102. After each haul truck is filled to a desired level, the haul truck may travel to a dump location (not shown) before returning to be filled again.

Figure 2:
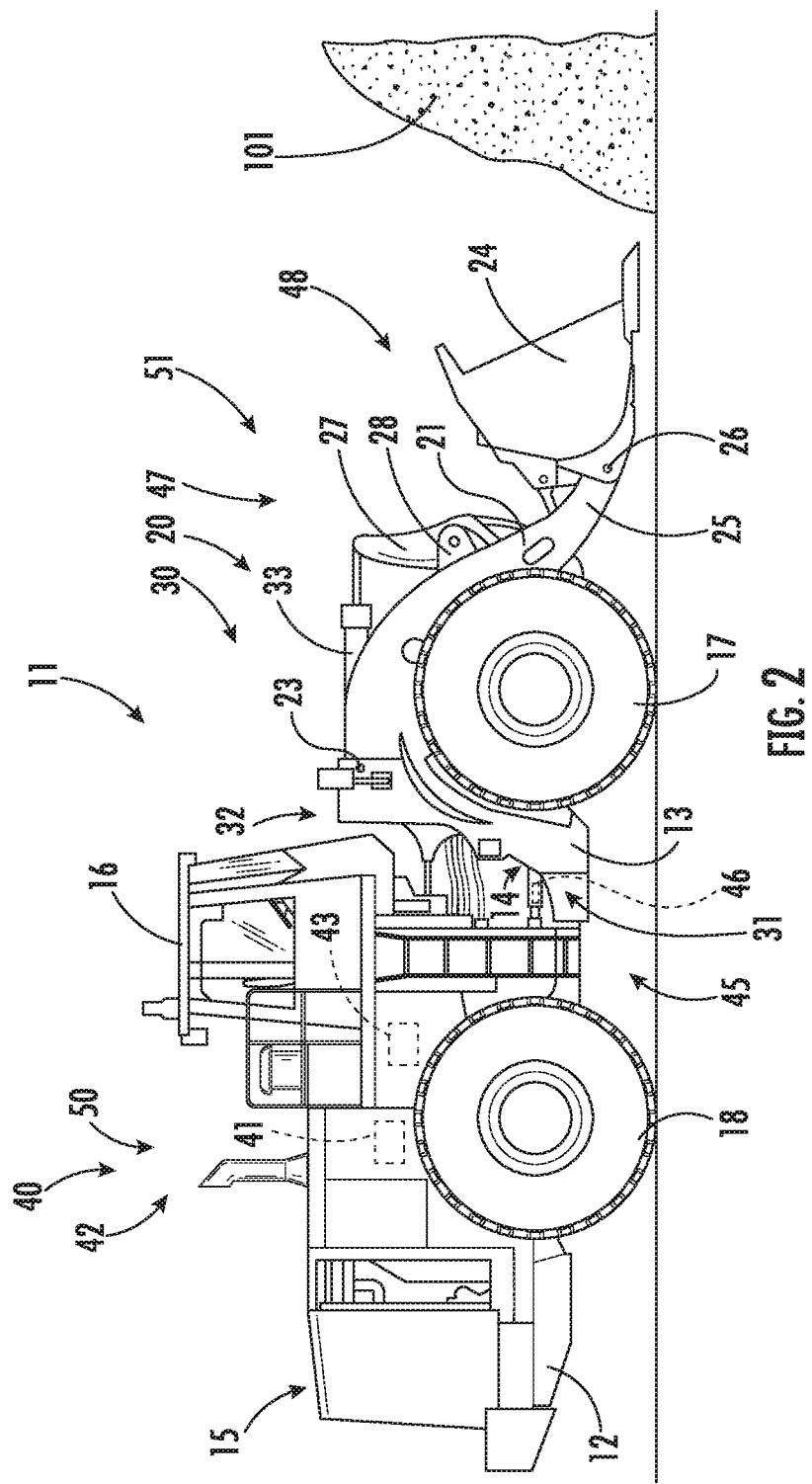
FIG. 2 depicts a schematic illustration of a machine in which the principles disclosed herein may be used.

Referring to FIG. 2, a diagrammatic illustration of a wheel loader 11 is illustrated. The wheel loader 11 may include a body having a base portion 12 and an implement support portion 13 pivotally mounted on the base portion by an articulating joint 14. The base portion 12 houses a prime mover 15 such as an engine and an operator station or cab 16 in which an operator may be positioned. The prime mover 15 is operatively connected to and drives a ground engaging drive mechanism such as front wheels 17 and rear wheels 18 to operate as a propulsion system. The base portion 12 includes the rear wheels 18 while the implement support portion 13 includes the front wheels 17. The articulating joint 14 permits the implement support portion 13 to pivot or move relative to the base portion 12 for purposes of steering the wheel loader 11.

The implement support portion 13 includes a linkage 20 having one or more lift arms 21 pivotally connected to the implement support portion 13 at first pivot joint 23. A work implement such as bucket 24 may be pivotally mounted at a distal end 25 of the lift arms 21 at a second pivot joint 26. A curl lever 27 may be pivotally mounted on curl lever support member 22 of implement support portion 13 with a first end (not shown) connected to a curl link member 28 that is pivotally connected to bucket 24. With this configuration, rotation of the curl lever 27 results in curling or tilting of the bucket 24 about the second pivot joint 26.

The wheel loader 11 may include a system such as an electro-hydraulic system generally indicated at 30 for operating various systems and components of the machine. A pair of steering cylinders 31 (only one being visible in FIG. 2) extends between the base portion 12 and the implement support portion 13 and operate to control the movement of the implement support portion relative to the base portion about the articulating joint 14 to control the steering of the wheel loader 11. A pair of lift cylinders indicated generally at 32 may operatively extend between the implement support portion 13 to the lift arms 21 to facilitate raising and lowering of the lift arms about first pivot joint 23. A curl cylinder 33 may operatively extend between the implement support portion 13 and the curl lever 27 to facilitate rotation or tilting of the bucket 24 about second pivot joint 26. The steering cylinders 31, the lift cylinders 32, and the curl cylinder 33 may be electro-hydraulic cylinders or any other type of desired cylinders or actuators.

Figure 3:
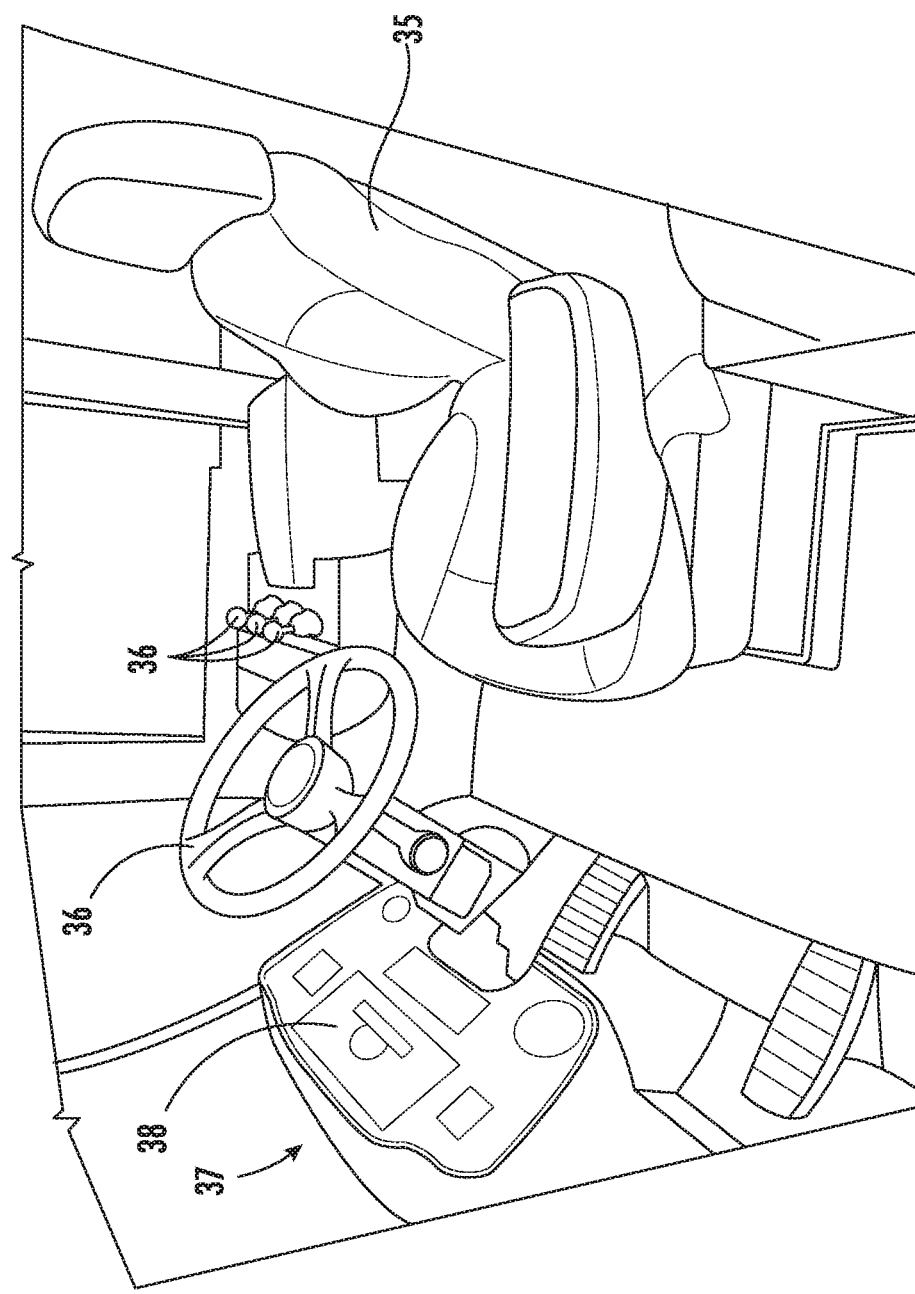
FIG. 3 depicts a perspective view of a cab of the machine of FIG. 2.

Referring to FIG. 3, cab 16 may include an operator seat 35, one or more input devices 36 such as a steering wheel, levers, knobs, buttons, joysticks, pedals, etc. through which the operator may issue commands to control the operation of the wheel loader 11 such as the propulsion and steering as well as operate various implements associated with the machine. One or more instrument arrays 37 may be positioned within the cab 16 to provide information to the operator and may further include additional input devices such as knobs and buttons. Cab 16 may further include a visual image display device such as a display screen 38.

Wheel loader 11 may include a control system 40, as shown generally by an arrow in FIG. 2 indicating association with the machine. The control system 40 may utilize one or more sensors to provide data and input signals representative of various operating parameters of the wheel loader 11 and the environment of the work site 100 at which the machine is operating. The control system 40 may include an electronic control module or controller 41 and a plurality of sensors associated with the wheel loader 11.

The controller 41 may be an electronic controller that operates in a logical fashion to perform operations, execute control algorithms, store and retrieve data and other desired operations. The controller 41 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 41 such as power supply circuitry, signal conditioning circuitry, driver circuitry, and other types of circuitry.

The controller 41 may be a single controller or may include more than one controller disposed to control various functions and/or features of the wheel loader 11. The term "controller" is meant to be used in its broadest sense to include one or more controllers and/or microprocessors that may be associated with the wheel loader 11 and that may cooperate in controlling various functions and operations of the machine. The functionality of the controller 41 may be implemented in hardware and/or software without regard to the functionality. The controller 41 may rely on one or more data maps relating to the operating conditions and the operating environment of the wheel loader 11 and the work site 100 that may be stored in the memory of controller. Each of these data maps may include a collection of data in the form of tables, graphs, and/or equations.

The control system 40 and controller 41 may be located on the wheel loader 11 or may be distributed with components also located remotely from the machine such as at a command center (not shown). The functionality of control system 40 may be distributed so that certain functions are performed at wheel loader 11 and other functions are performed remotely. In such case, the control system 40 may include a communications system such as wireless network system (not shown) for transmitting signals between the wheel loader 11 and a system located remote from the machine such as at the command center.

Wheel loader 11 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the wheel loader 11 and that may cooperate to sense various functions, operations, and operating characteristics of the machine and/or aspects of the environment in which the machine is operating.

A position sensing system 42, as shown generally by an arrow in FIG. 2 indicating association with the wheel loader 11, may include a position sensor 43 to indicate association with the machine, that is operative to sense the position of the machine relative to the work site 100. The position sensor 43 may include a plurality of individual sensors that cooperate to generate and provide position signals to controller 41 indicative of the position of the wheel loader 11. In one example, the position sensor 43 may include one or more sensors that interact with a positioning system such as a global navigation satellite system or a global positioning system to operate as a position sensor. The controller 41 may use position signals from the position sensor 43 to determine the machine position within work site 100. In other examples, the position sensor 43 may include an odometer or another wheel rotation sensing sensor, a perception based system, or may use other systems such as lasers, sonar, radar, or a terrestrial radio-based triangulation or proximity system to determine all or some aspects of the position of wheel loader 11.

An articulating joint position sensor 45, as shown generally by an arrow in FIG. 2, may be provided and is operative to sense the angular position of the implement support portion 13 relative to the base portion 12 as it rotates about the articulating joint 14. In one embodiment, the articulating joint position sensor 45 may be configured as a displacement sensor 46 associated with each of the steering cylinders 31. The displacement sensors 46 may generate and provide displacement signals to controller 41 indicative of the displacement of each of the steering cylinders 31. The controller 41 may analyze the displacement signals from each steering cylinder 31 to determine the displacement of each steering cylinder and then determine the angular orientation of the implement support portion 13 relative to the base portion 12 based upon the relative positions of the steering cylinders.

A lift position sensor 47, as shown generally by an arrow in FIG. 2, may be provided and is operative to sense the angular position of the lift arms 21 relative to the implement support portion 13 as the lift arms rotate about the first pivot joint 23. In one embodiment, the lift position sensor 47 may be configured as a displacement sensor 46 associated with one or more of the lift cylinders 32. The displacement sensors 46 may generate and provide displacement signals to controller 41 indicative of the displacement of the lift cylinders 32. The controller 41 may analyze the displacement signals from the displacement sensors 46 to determine the position of the lift arms 21 based upon the position of the lift cylinders and the dimensions of the lift arms and lift cylinders 32. In other words, based upon the extent to which the lift cylinders 32 are extended, the controller 41 may determine the angle of the lift arms 21 relative to the implement support portion 13.

A curl position sensor 48, as shown generally by an arrow in FIG. 2, may be provided and is operative to sense the angular position of the bucket 24 relative to the lift arms 21 as the bucket rotates about the second pivot joint 26. In one embodiment, the curl position sensor 48 may be configured as a displacement sensor 46 associated with the curl cylinder 33. The displacement sensor 46 may generate and provide displacement signals to controller 41 indicative of the displacement of the curl cylinder 33. The controller 41 may analyze the displacement signals from the displacement sensor 46 to determine the position of the bucket 24 based upon the position of the curl cylinder 33 and the dimensions of the curl lever support member 22, curl lever 27, curl link member 28, and curl cylinder 33. Based upon the extent to which the curl cylinder 33 is extended, the controller 41 may determine the angle of the bucket 24 relative to the lift arms 21.

Other types of sensors such as, for example, rotary potentiometers may be used rather than cylinder displacement sensors to determine the relative angles between the pivotable components (i.e., implement support portion 13 relative to base portion 12, lift arms 21 relative to implement support portion 13, and bucket 24 relative to lift arms 21). Additional sensors may be provided, if desired, to generate signals indicative of the relative angular velocity and angular acceleration between the pivotable components as they rotate about their pivot joints. In an alternate embodiment, controller 41 may be configured to determine the relative angular velocity and angular acceleration based upon the signals from the different position sensors. For example, controller 41 may monitor or determine the rate of change of the relative positions of the components to determine the angular velocity.

Figure 4:
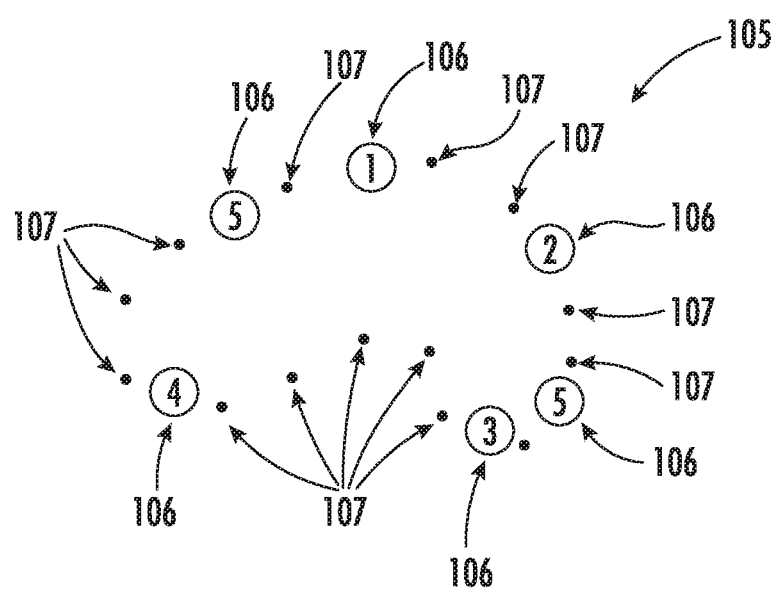
FIG. 4 depicts a schematic illustration of a closed loop path about which the machine of FIG. 2 may operate.

Wheel loader 11 may be used to perform many different operations. In many instances, the machine operator may be performing repetitive operations over an extended period of time and along a consistent or repeating path. In other words, the wheel loader 11 may repeatedly perform various operations while travelling along a closed loop path 105 (FIG. 4).

As an example, a wheel loader 11 may be used to repeatedly dig into a pile of loose material 101 such as gravel or dirt with bucket 24, lift a bucket load of material, and subsequently move the bucket load of material to a desired location such as within a haul truck. Each of the operations of digging into the pile of material and loading the bucket 24 may be segmented into a plurality of sequential tasks and the efficiency of each task may be measured based upon operating characteristics such as the relative or absolute positions and/or speeds of movement of the wheel loader 11 and its various components (e.g., lift arms 21 and bucket 24). The operating characteristics may be compared to one or more desired thresholds to evaluate or rate the performance of an operator for each task as well as, in some instances, for the entire operation. Inasmuch as it may be desirable to either exceed or remain below a threshold, depending upon the operation, the phrase "operating range" may be used herein to refer to a range of any value up to a threshold, from a threshold to any value, or between two thresholds.

Controller 41 may include a machine operation coaching system 50 that is operative to analyze an operator's performance and provide feedback to the operator as well as provide instructions or suggestions to improve the operator's performance. To do so, one or more operations may be segmented or broken into a plurality of quantitatively measurable tasks and each of the tasks measured against a desired operating range. In other words, each operation may be divided into a plurality of tasks that may be evaluated based upon desired positions and speeds of the wheel loader 11 and its various components.

The operator's performance of each task as well as, in some instances, the overall operation may be measured and stored as it travels about the closed loop path 105 in order to provide feedback to the operator as well as to management personnel. In an embodiment, the machine operation coaching system 50 may only store instances in which the tasks do not meet the desired threshold or are not within the desired operating range. Further, a log or listing of the performance of each task may be stored together with the physical location of the wheel loader 11 to facilitate improved feedback to the wheel loader operator. For example, the machine operation coaching system 50 may store the instances in which the tasks do not meet the desired threshold or are not within the desired operating range together with the position of the wheel loader while performing such a task. In an embodiment, the position may be stored as GPS coordinates corresponding to the position of the wheel loader 11. In another embodiment, the position may be stored on a map of the work site 100. In another embodiment, the machine operation coaching system 50 may store all instances in which the tasks forming each operation are performed together with the physical location of the wheel loader 11.

Figure 5:
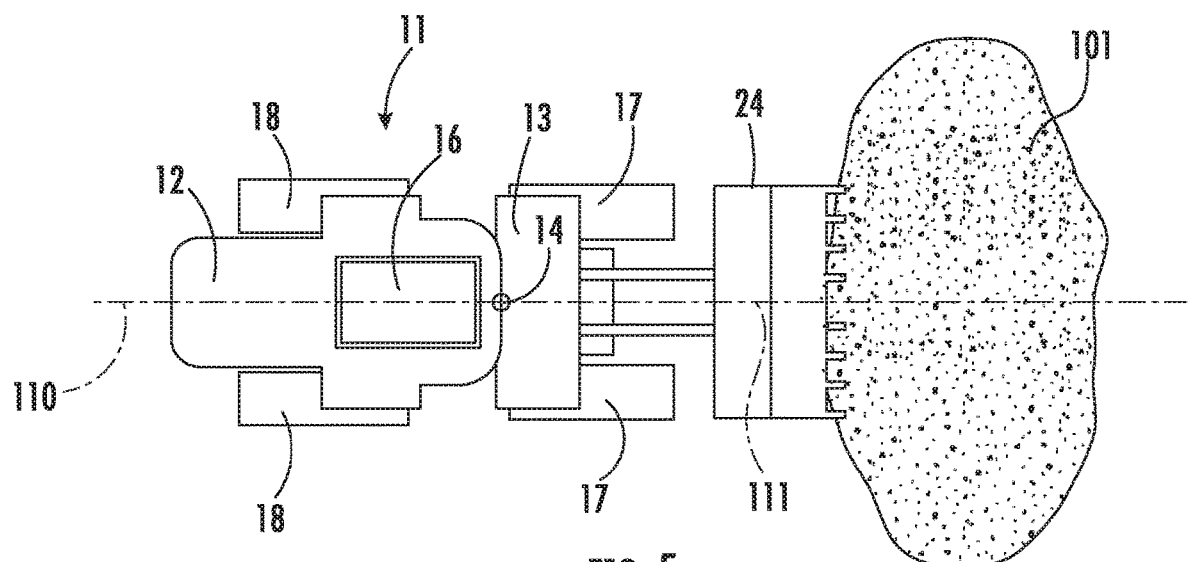
FIG. 5 depicts a simplified illustration of a first quantitatively measurable task being performed properly.
Figure 6:
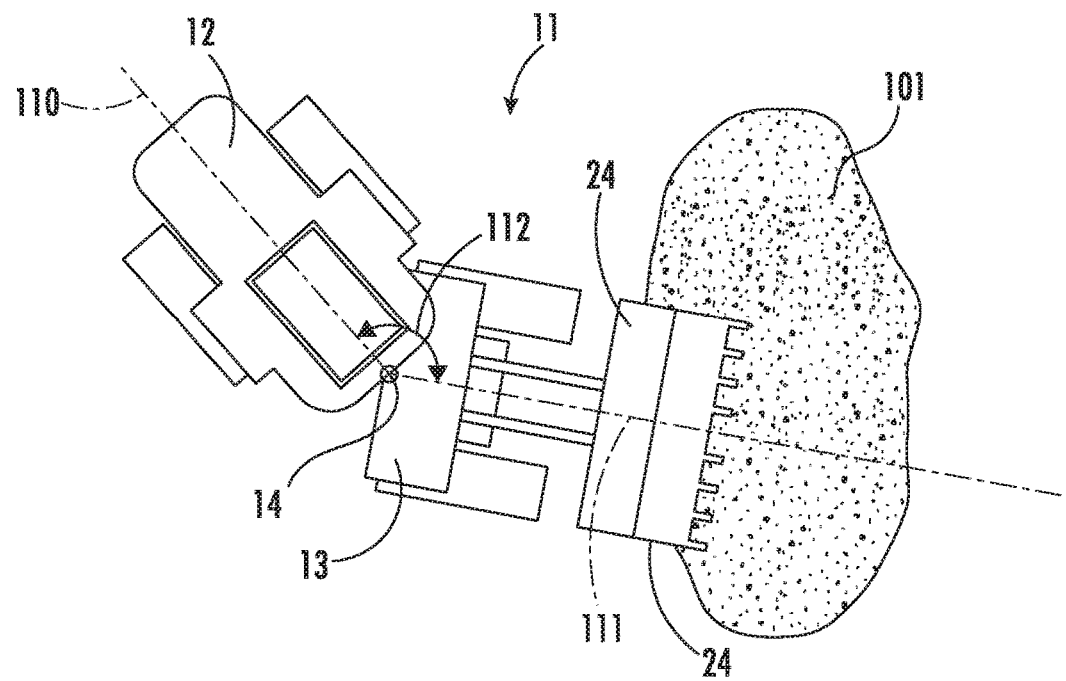
FIG. 6 depicts a simplified illustration of the first quantitatively measurable task of FIG. 4 but with the task being performed poorly.

FIGS. 5-15 depict a series of sequential tasks associated with loading material 101 into bucket 24 that may be quantitatively measured. Referring first to FIGS. 5-6, it is generally desirable for wheel loader 11 to enter a pile of material 101 with the base portion 12 and the implement support portion 13 aligned as depicted in FIG. 5. More specifically, the axis 110 of the base portion 12 and the axis 111 of the implement support portion 13 are co-linear and thus the articulation angle 112 is zero in FIG. 5 but substantially greater than zero in FIG. 6. If the base portion 12 is rotated relative to the implement support portion 13 as depicted in FIG. 6, the bucket 24 will not enter the pile of material 101 as effectively and the wheels are more likely to slip. In addition, the articulating joint 14 and components associated with the relative movement between the base portion 12 and the implement support portion 13 such as steering cylinders 31 may be subjected to additional wear due to the misalignment between the base portion and the implement support portion.

The controller 41 may determine the extent to which the base portion 12 and the implement support portion 13 (i.e., the articulation angle 112) are aligned based upon data from the articulating joint position sensor 45 as described above. One or more thresholds in the form of a maximum desired misalignment or articulation angle 112 may be stored within controller 41. The controller 41 may be configured to compare the actual misalignment between the base portion 12 and the implement support portion 13 (i.e., the articulation angle 112) to one of the thresholds in order to evaluate or measure an operator's performance.

The controller 41 may be configured to evaluate or monitor the articulation angle 112 when the bucket 24 engages the pile of material 101. To determine when the bucket 24 initially engages the pile of material 101, the controller 41 may utilize an implement load sensor system 51 indicated generally in FIG. 2. In one embodiment, the implement load sensor system 51 may embody sensors for measuring changes in the powertrain system such as a change in the difference between output from the prime mover 15 and output from a torque converter (not shown). While approaching the pile of material 101, the engine output speed and the torque converter output speed may be relatively constant. However, upon engaging the pile of material 101, the load on the bucket 24 will be increased thus slowing the wheel loader 11 and causing a change in the relative speeds between the prime mover 15 and the torque converter. Accordingly, by monitoring the difference between the prime mover speed and the torque converter speed, an increase in load on the bucket 24 may be determined that is indicative of engagement of the bucket with the pile of material 101.

Other manners of determining when the bucket 24 is initially engaging the pile of material 101 are contemplated. For example, in alternate embodiments in which the machine propulsion and drivetrain mechanisms are hydrostatic or electric, implement load sensor system 51 may embody other sensors that detect a difference between output from the prime mover and other aspects of the propulsion and drivetrain mechanisms. In another alternate embodiment, the implement load sensor system 51 may utilize one or more pressure sensors (not shown) associated with one or more of the hydraulic cylinders to determine when the load on the bucket 24 initially increases relatively quickly indicating the initial engagement between the bucket and the pile of material 101.

Figure 7:
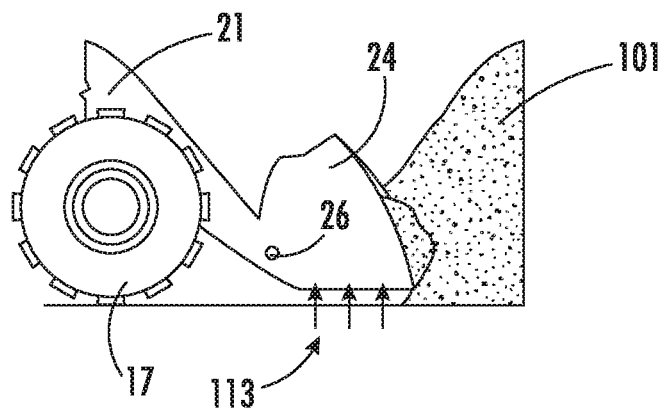
FIG. 7 depicts a simplified illustration of a second quantitatively measurable task being performed properly.

Referring to FIG. 7, another quantitatively measurable task associated with loading bucket 24 is depicted. As the bucket 24 engages the pile of material 101, the load on the bucket will increase substantially causing the wheel loader 11 to slow down rapidly which may cause the front wheels 17 to slip and reduce the machine's ability to propel the bucket 24 into the pile of material. Accordingly, it is typically desirable for an operator to slightly lift the lift arms 21 (and thus bucket 24 also) as the bucket enters the pile of material 101 as depicted at 113 to thus increase the load in the bucket which will increase the tractive force of the front wheels 17. The action of slightly lifting the lift arms 21 is sometimes referred to as "setting the tires" and is desirable as it reduces wheel slip which increases efficiency and reduces tire wear. The increased tractive force also permits the bucket 24 to enter farther into the pile of material 101 and thus may increase the payload that the wheel loader 11 may be able to effectively load into the bucket.

The controller 41 may determine whether an operator has "set the tires" by monitoring the angle of the lift arms 21 relative to the implement support portion 13 as they pivot or rotate about first pivot joint 23 based upon data from the lift position sensor 47 as described above. One or more desired thresholds may be stored within controller 41. The desired thresholds may include the extent to which the lift arms should be raised (e.g., expressed as an angle about first pivot joint 23 or a distance) as well as the timing in which the operation should begin relative to engagement of the pile of material 101 by the bucket 24. The controller 41 may be configured to compare the extent of actual movement of the lift arms 21 relative to the implement support portion 13 and its timing to the desired thresholds in order to evaluate or measure an operator's performance.

The controller 41 may begin evaluating the operator's performance upon determining engagement of the bucket 24 with the pile of material 101 as described above.

Figure 8:
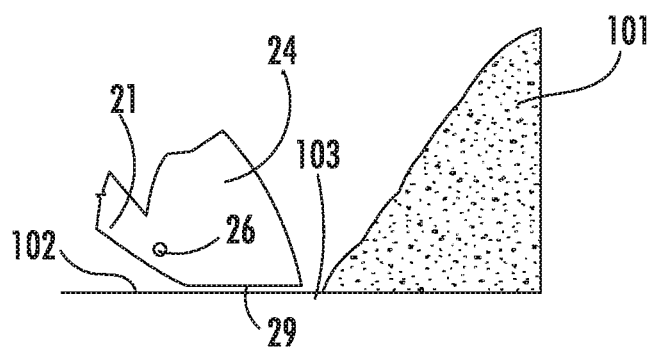
FIG. 8 depicts a simplified illustration of a third quantitatively measurable task being performed properly.
Figure 9:
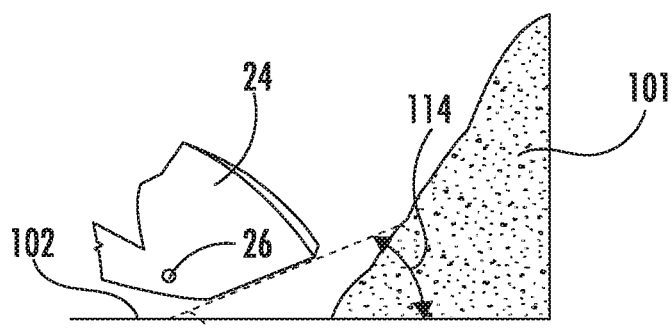
FIG. 9 depicts a simplified illustration of the third quantitatively measurable task of FIG. 8 but with the task being performed poorly.
Figure 10:
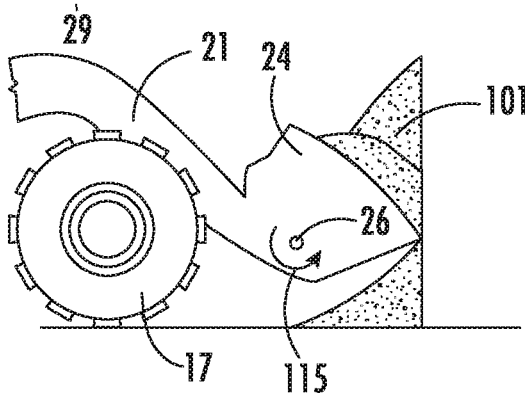
FIG. 10 depicts a simplified illustration of a fourth quantitatively measurable task being performed properly.

Additional quantitatively measurable tasks may be associated with the physical loading of the bucket 24 as it enters the pile of material 101. For example, it is generally desirable for the bucket 24 to enter the pile of material 101 at a desired angle relative to the ground or the pile of material, and it is generally desirable for the bucket to be curled and the lift arms 21 to be raised in a desired manner to maximize the efficiency of the bucket loading process. More specifically, it is generally desirable for the bucket 24 to enter the pile of material 101 with the lower surface 29 of the bucket generally parallel to the work surface 103 as depicted in FIG. 8. If the bucket 24 is curled upwards about second pivot joint 26, as depicted in a somewhat exaggerated manner in FIG. 9, the bucket will be less likely to effectively penetrate the pile of material 101 and may slide up the pile rather than dig into the pile which is likely to result in an under-filled bucket.

The controller 41 may determine the angle 114 (FIG. 9) of the bucket 24 as it enters the pile of material 101 relative to the work surface 103 based upon data from the position sensor 43 and the curl position sensor 48. The controller 41 may be configured to compare the actual angle 114 of the bucket 24 relative to the desired threshold in order to rate the performance of the operator. While the lower surface 29 of the bucket 24 would be generally parallel to the work surface 103 as depicted in FIG. 8 in an ideal operation, the threshold may be stored as an angle greater than zero.

The controller 41 may begin evaluating the operator's performance upon determining engagement of the bucket 24 with the pile of material 101 as described above.

Additional quantitatively measurable tasks may also be associated with the specific manner in which the bucket 24 is loaded. When loading bucket 24, it is generally desirable for the machine to move forward with the bucket beginning to penetrate the pile of material 101 and then slightly curling the bucket or rotating it upward about second pivot joint 26 as depicted by arrow 115 in FIG. 10 by actuating curl cylinder 33. The process is repeated by alternatingly moving the wheel loader 11 slightly forward farther into the pile of material and then slightly curling the bucket an additional amount so that additional material will be gathered into the bucket. The process may be continued until the bucket is completely filled.

Figure 11:
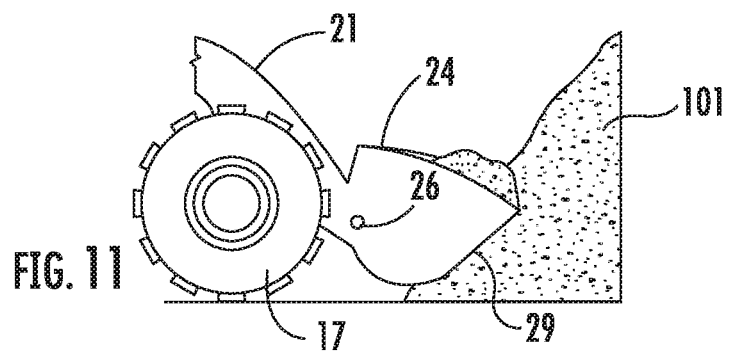
FIG. 11 depicts a simplified illustration of the fourth quantitatively measurable task of FIG. 9 but with the task being performed poorly.

In one example, poor or inefficient filling of the bucket 24 will occur if the bucket is curled too quickly about second pivot point 26 as the bucket engages the pile of material 101. When curling the bucket 24 too quickly, the angle of the bucket will be pointed somewhat upward so that the bucket does not effectively dig into the pile of material 101 as depicted in FIG. 11 as the wheel loader 11 moves into the pile of material 101, resulting in the bucket being only partially filled.

The controller 41 may determine whether an operator has curled the bucket 24 too quickly based upon data from the curl position sensor 48, which may be used to determine the actual position of the bucket or the rate at which the bucket is rotating, as well as based upon data from the position sensor 43 as the wheel loader 11 moves forward into the pile of material 101.

The controller 41 may begin evaluating the operator's performance upon determining engagement of the bucket 24 with the pile of material 101 as described above. In one embodiment, the desired threshold set or stored within the controller 41 may include a desired amount of rotation of the bucket 24 based upon the distance that the wheel loader 11 has moved once it has entered the pile of material 101. In another embodiment, the controller 41 may compare the rate at which the bucket 24 is rotating to a desired threshold.

Figure 12:
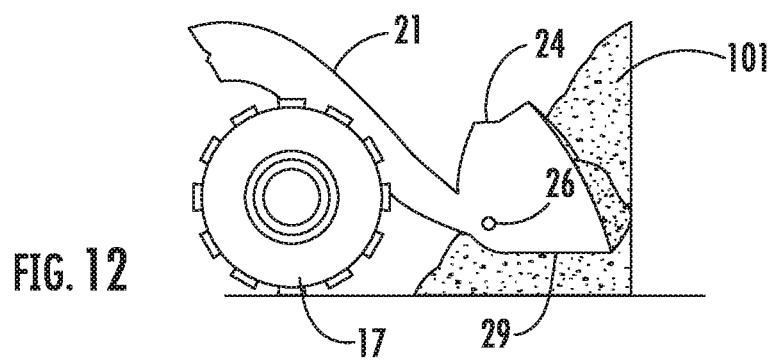
FIG. 12 depicts a simplified illustration of a fifth quantitatively measurable task being performed poorly.
Figure 13:
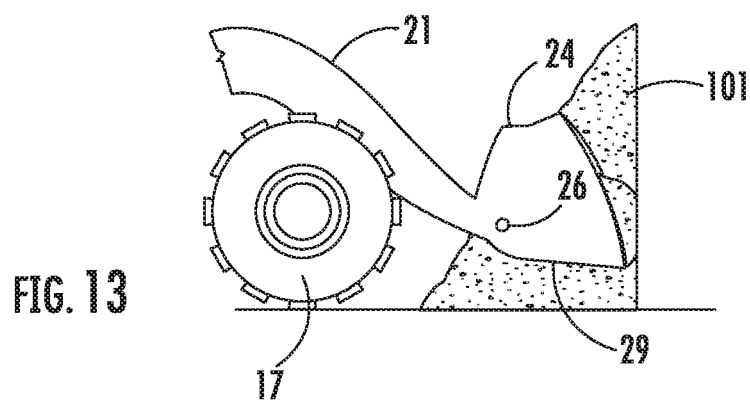
FIG. 13 depicts a further simplified illustration of the fifth quantitatively measurable task being performed poorly.
Figure 14:
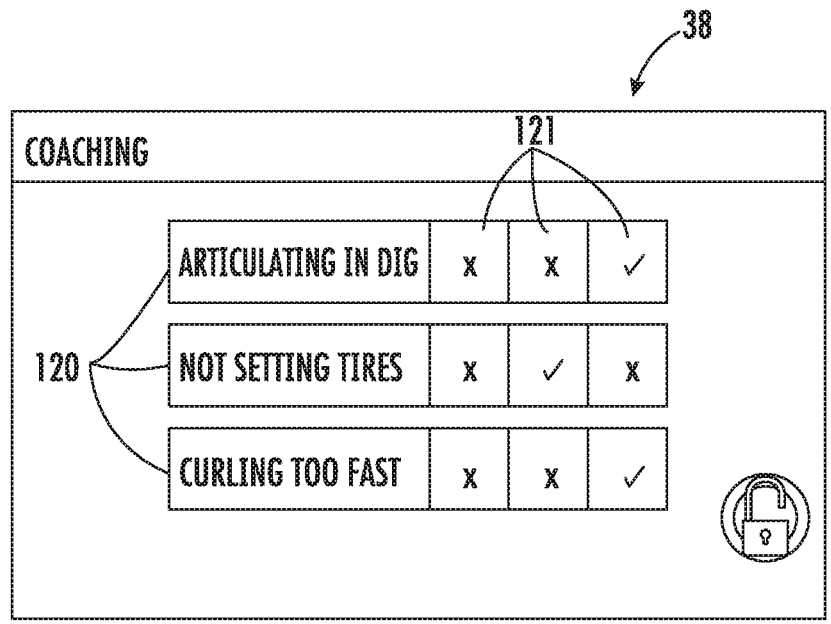
FIG. 14 depicts an example of evaluation images displayed on a display screen of the machine.

In another example, poor or inefficient filling of the bucket 24 will occur if the bucket is curled and uncurled or "pumped" as the bucket is moved into the pile of material 101 as depicted in FIGS. 12-13. Pumping of the bucket 24 may occur when the operator causes the bucket to enter the pile of material 101 at a proper angle (FIG. 12), curls the bucket to partially load the bucket, and then uncurls the bucket (FIG. 13) to change the angle of the bucket so that it more easily enters the pile of material 101. By way of example, the lower surface 29 of bucket 24 is angled downward in FIG. 13. The operator may repeat this action as the wheel loader 11 moves forward into the pile of material 101 to fully load the bucket 24. Pumping the bucket 24 is generally undesirable because it increases the time necessary to fill the bucket, it reduces loading on the front wheels 17 and therefore may cause tire slip, it increases the stress on the joints of the wheel loader 11, and it may be harmful or hazardous to an operator.

The controller 41 may determine whether an operator is pumping the bucket 24 based upon data from the curl position sensor 48 as well as based upon data from the position sensor 43 as the wheel loader 11 moves forward into the pile of material 101. The controller 41 may begin evaluating the operator's performance upon engagement of the bucket 24 with the pile of material 101. The controller 41 may monitor the angle of the bucket 24 relative to the lift arms 21 and compare the amount or angle of uncurling of the bucket about second pivot joint 26, if any, to a threshold angle. In one embodiment, a single act of uncurling of the bucket 24 by more than a threshold angle may be unacceptable. In another embodiment, multiple events of uncurling of the bucket 24 by more than a threshold angle as the wheel loader 11 moves forward into the pile of material 101 may be unacceptable.

In still another example, poor or inefficient filling of the bucket 24 will occur if the operator uses the lift arms 21 as a significant part of the bucket filling process rather than utilizing the curl cylinder 33 and the forward movement of the wheel loader 11. When improperly using the lift arms 21, the operator may significantly raise the lift arms while only minimally curling the bucket 24. Excessive use of the lift arms 21 during the bucket loading process is generally undesirable as it will increase the time required to fill the bucket 24, may cause tire slip, and may cause the wheel loader 11 to climb up the pile of material 101 which may damage the tires and put the machine in an unstable position.

The controller 41 may determine whether an operator is loading the bucket 24 using the lift arms 21 based upon data from the lift position sensor 47 as well as based upon data from the position sensor 43 as the wheel loader 11 moves forward into the pile of material 101. The controller 41 may begin evaluating the operator's performance upon engagement of the bucket 24 with the pile of material 101 and terminate the analysis once the wheel loader 11 begins moving in reverse away from the pile of material. The controller 41 may monitor the angle of the lift arms 21 relative to the implement support portion 13 and compare movement of the lift arms about first pivot joint 23 to a threshold angle or amount of movement. In one embodiment, the controller 41 may be configured so that the lift arms 21 are only to be used while setting the tires as described above. In another embodiment, raising the lift arms 21 more than a threshold angle or distance may be unacceptable.

In a further example, poor or inefficient filling of the bucket 24 may occur if the wheel loader 11 is in second gear during the bucket filling process. In other words, it is generally desirable for the wheel loader 11 to be in first gear as the bucket 24 engages the pile of material 101 and the bucket is filled. If the wheel loader 11 is in second gear rather than first gear, the bucket 24 may be less likely to penetrate the pile of material 101 and therefore the bucket may not be filled as desired.

The controller 41 may determine whether the machine is in first gear or has been shifted into a state that will permit it to automatically shift from second gear to first gear based upon the status of an input device associated with the transmission (not shown) of the machine. In one embodiment, the controller 41 may begin evaluating the status of the transmission upon engagement of the bucket 24 with the pile of material 101. In another embodiment, it may be desirable for the operator to shift the transmission into first gear or into an auto-shift mode a predetermined time or distance before the bucket 24 engages the pile of material 101. In such case, the controller 41 may monitor the status of the transmission and compare the time of shifting to the time that the bucket 24 engages the pile of material to determine whether a shift was made within or outside the desired threshold.

The machine operation coaching system 50 may analyze the quantitatively measurable task(s) that make up an operation in order to determine the quality of the performance of each task. In some embodiments, an operation may comprise a single task. In other embodiments, an operation may comprise a plurality of tasks. If the tasks performed are outside of the desired threshold or are not within the desired operating range, the identity of the "failed" tasks may be stored such as by the controller 41 together with the associated machine position of the machine 10 while performing the failed task. The machine position may be may be stored as GPS coordinates or as a position on a map of the work site 100. In some instances, some or all instances of the tasks, whether pass or fail, may be stored together with the associated machine position while performing the task. For example, as depicted in FIG. 4, a plurality of points 106 on the closed loop path 105 are identified by a number corresponding to the failed task.

The control system 40 may also generate additional information that may be stored and displayed on the map of the closed loop path 105. For example, as the machine 10 moves about the work site 100, the controller 41 may monitor other aspects of the machine operation. While doing so, the controller 41 may also record or store machine events that occur as the machine 10 moves about the work site 100. In one example, the controller 41 may record instances in which the machine operation is outside an expected range of machine operation or performance, such as RPMs, wheel slip, hydraulic pressure, etc. Upon the occurrence of such a machine event, the details of the machine events may be recorded or stored together with the position of the machine 10 during such event. The position may be may be stored as GPS coordinates or as a position on a map of the work site 100 and may be displayed on the map of the closed loop path 105 if desired. In addition or in the alternative, correlation between the machine events and failed tasks may be monitored.

Further, the controller 41 may also record or store instances in which machine diagnostic events occur together with the position of the machine 10 during such diagnostic event. The position may be may be stored as GPS coordinates or as a position on a map of the work site 100. Examples of machine diagnostic events include generating machine diagnostic codes that are indicative of failures or error codes associated with machine operation.

In addition, the controller 41 may also periodically record the position of the machine 10 as it moves about the closed loop path 105 such as upon the machine travel distance exceeding a travel distance threshold without otherwise storing the current machine position or GPS coordinates (such as due to a failed machine task, the occurrence of a machine event, or the occurrence of a machine diagnostic event) of the machine. In other words, in order to plot a sufficient number of points along the closed loop path 105, the controller 41 may periodically store points 107 (FIG. 4) corresponding to the location of the machine 10 in instances in which the travel distance threshold has been exceeded and the location of the machine has not otherwise stored.

The controller 41 may also be configured to display feedback on the display screen 38 within the cab 16 in the form of a map of the closed loop path 105 together with the identification and location of any failed tasks along the path. In an embodiment, the closed loop path 105 may be displayed as a series of points 106 corresponding to their position or GPS coordinates together with the failed tasks identified in any desired manner. In one embodiment, the identification may include numbers associated with the failed tasks and the numbers displayed on the map adjacent their corresponding position or GPS coordinates.

If desired, in an alternative view on the display screen 38, an operator may view the most recent occurrence of some or all of the tasks 120 (FIG. 14) corresponding to failed tasks together with an evaluation identifier 121 such as a checkmark designating a task that is within a desired threshold and an "X" designating a failed task (i.e., outside of a desired threshold or not within the desired operating range). The controller 41 may be configured to display the evaluation identifier 121 of each task for a predetermined number of previous operations.

Figure 15:
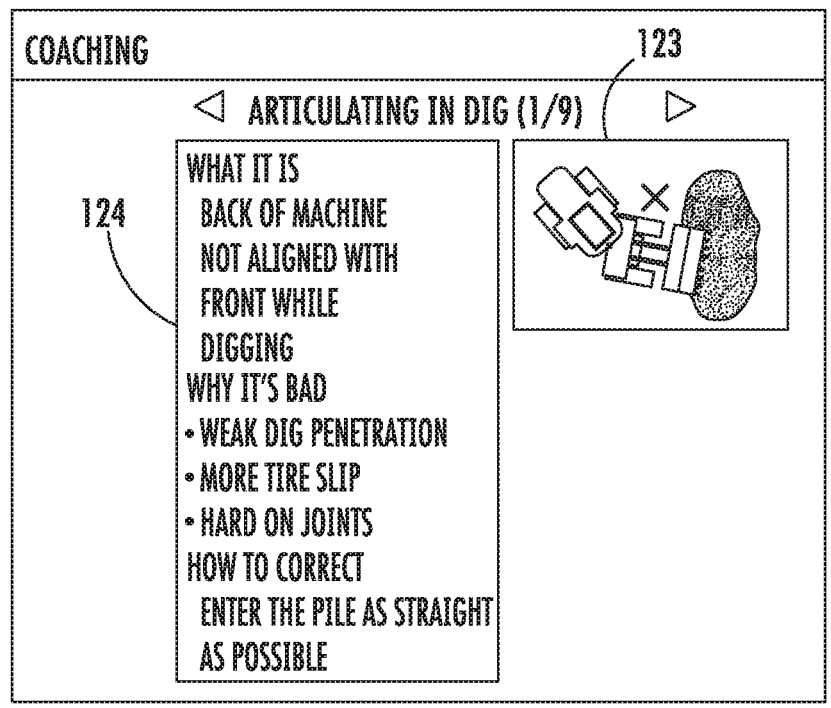
FIG. 15 depicts a view similar to FIG. 14 but instructional images displayed on the display screen.

Further, the controller 41 may also store instructional materials such as instructional videos, animations, and written suggestions on how an operator may improve their performance with respect to each task. For example, after performing a series of operations or at any other time, an operator may want to view the instructional materials. Upon positioning the machine 10 in a safe location, stopping the machine and applying the brake, the operator may use an input device to view the instructional materials to remind the operator of the desired or optimal manner of performing each task that makes up an operation. An example of an animation 123 and written suggestions 124 are depicted in FIG. 15.

Figure 16:
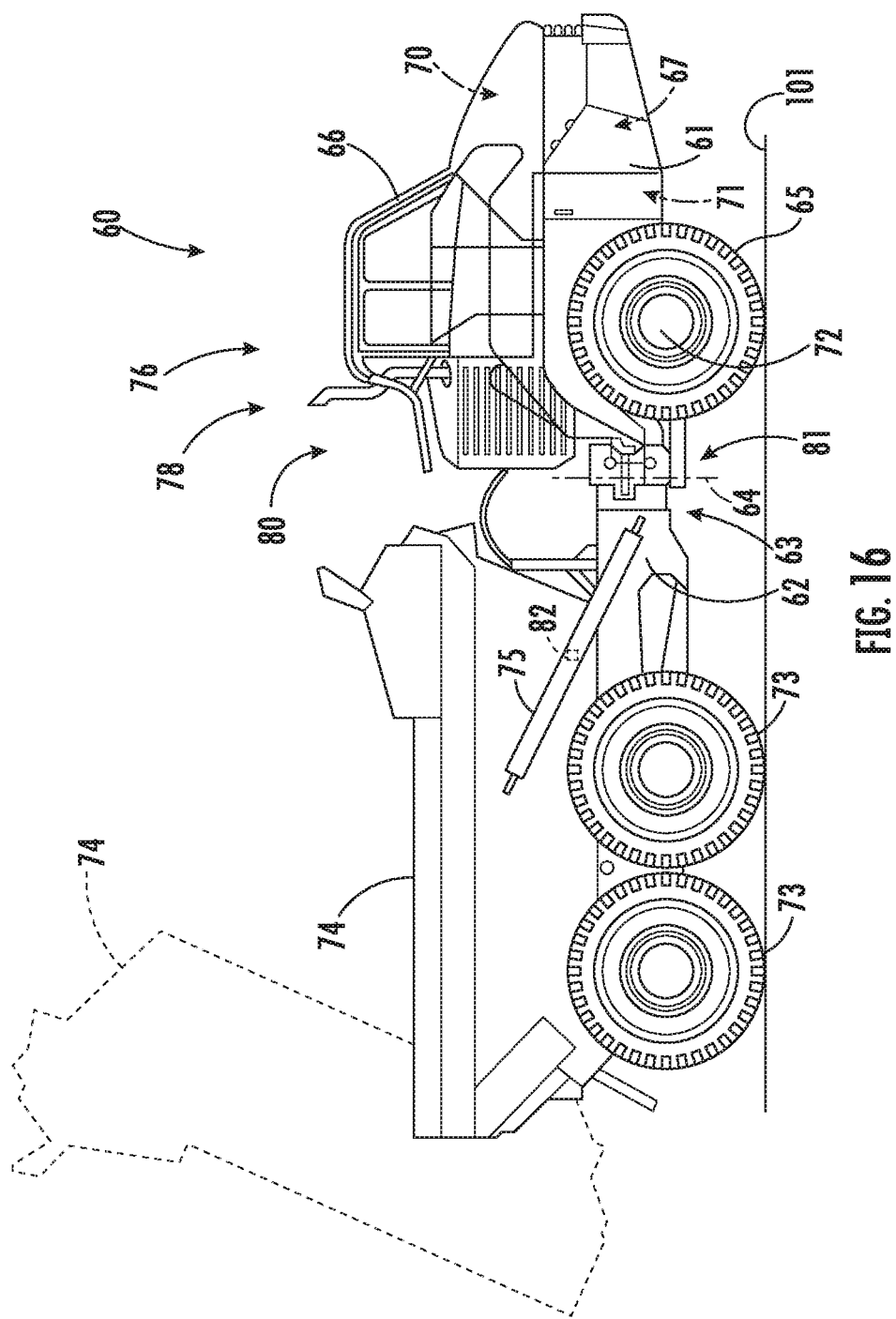
FIG. 16 depicts a schematic illustration of a second embodiment of a machine in which the principles disclosed herein may be used.

Although described above with respect to wheel loader 11, the machine operation coaching system 50 may also be used with other types of machines. For example, a machine 10 such as an articulated truck 60 depicted in FIG. 16 may be used to perform a plurality of repetitive operations as the truck travels about the closed loop path 105 (FIG. 4). The articulated truck 60 includes a front frame portion 61 and a rear frame portion 62 coupled at an articulation joint 63 defining an articulation axis 64. The front frame portion 61 may be supported by a plurality of ground engaging drive mechanisms, such as front wheels 65 and may support an operator station or cab 66 and a drive system depicted generally at 67. The drive system 67 may include a prime mover such as an internal combustion engine, depicted generally at 70, configured to transmit power to a transmission, depicted generally at 71, including a plurality of gears. The transmission 71 in turn may be configured to transmit power to the ground engaging drive mechanisms (e.g., front wheels 65) by way of axle 72 using any known means.

The rear frame portion 62 may be supported by a plurality of ground engaging drive mechanisms, such as rear wheels 73 and supports a work implement in the form of a bed or dump body 74. The dump body 74 may be selectively pivoted between a load position (illustrated) and a dump or unload position (shown in phantom) by one or more hoist cylinders 75 in response to a hoist command such as one generated by an operator located in the cab 66.

As with the wheel loader 11, the articulated truck 60 may include a control system 76 and a controller 77 similar or identical to those of the wheel loader 11 and the descriptions thereof are not repeated. The control system 76 may also include a machine operation coaching system generally indicated at 78 similar or identical to that of the wheel loader 11.

The articulated truck 60 may also include various systems and sensors that are similar or identical to those of the wheel loader 11. For example, the articulated truck 60 may include a position sensor 80, an articulating joint position sensor 81, and a dump body position sensor 82, each being generally similar to those of the wheel loader 11.

The repetitive operations of the articulated truck 60 may only include a single quantitatively measurable task as opposed to the plurality of tasks associated with the some of the operations of the wheel loader 11. A first example of a repetitive operation of the articulated truck 60 is the angle between the front frame portion 61 and the rear frame portion 62 while hoisting or raising the dump body 74. It is often desirable to minimize or limit the angle between the front frame portion 61 and the rear frame portion 62 of the articulated truck 60 while hoisting or raising the dump body 74 to dump a load of material. Raising the dump body 74 when the angle between the front frame portion 61 and the rear frame portion 62 exceeds a predetermined limit or threshold may result in premature wear or damage to suspension blocks on the articulated truck 60.

The machine operation coaching system 78 of the articulated truck 60 may determine the extent to which the front frame portion 61 and the rear frame portion 62 are aligned based upon data from the articulating joint position sensor 81. One or more thresholds in the form of a maximum desired misalignment or articulation angle may be stored within the controller 77. The controller 77 may be configured to compare the actual misalignment between the front frame portion 61 and the rear frame portion 62 (i.e., the articulation angle) and the articulation angle threshold in order to evaluate or measure the operator's performance. The controller 77 may be configured to evaluate or monitor the articulation angle each time the dump body 74 is raised. In one example, the evaluation may occur upon generating a command to raise the dump body 74. In another example, the evaluation may occur upon the physical movement of the dump body 74 such as upon the extension of one or more hoist cylinders 75 beyond a desired threshold as measured by the dump body position sensor 82. In another embodiment, the dump body position sensor may be configured as an inertial measurement unit that is used to measure the angular position of the dump body 74.

In another example of a repetitive operation of the articulated truck 60, it is generally desirable to shift the transmission 71 of the articulated truck 60 into neutral prior to raising the dump body 74. Maintaining the transmission 71 in gear while the truck remains stationary may cause two types of inefficiency. First, preventing movement of the articulated truck 60 while the transmission 71 is in gear may result in the generation of extra heat within the transmission, which may cause extra wear. Second, idling while in gear may also result in increased fuel consumption.

The machine operation coaching system 78 of the articulated truck 60 may monitor the transmission 71 each time the dump body 74 is raised. As described above, various manners of determining when the dump body 74 has been raised are possible such as by determining when a command is generated to raise the dump body or when the hoist cylinders 75 are extended beyond a threshold. By monitoring the state of the transmission 71 together with whether the dump body 74 has been raised, the controller 77 may determine whether the transmission is in neutral when raising the dump body.

In a further example of a repetitive operation, the amount of time the articulated truck 60 remains idling may be monitored. More specifically, the amount of idle time may be monitored to determine whether it is possible to improve the efficiency of the operation of the articulated truck 60. For example, the articulated truck 60 may include an "economy" mode of operation that optimizes powertrain controls for more fuel-efficient operation but which results in slower performance of the truck. If the articulated truck 60 is idling more than a threshold percentage of time during a particular material movement cycle (e.g., measured from dump operation to dump operation), it may be desirable to operate the machine in economy mode to improve fuel efficiency. The machine operation coaching system 78 may monitor the amount of idle time spent during each material movement cycle and compare the idle time to an idle time threshold.

The idle time may be an absolute amount of time or a percentage of the length of the entire material movement cycle.

Although described above with each task defining an identifiable separate action, in some instances, it may be desirable to segment an operation into a plurality of tasks that appear to be identical in action but may be differentiated by position. For example, in a grading operation performed by a motor grader (not shown), a consistent or constant grading operation may be performed over or along a relatively long distance. In such case, it may be desirable to determine whether or how well the operator is maintaining a consistent operation. Accordingly, even though an operation may be quantitatively measurable, it may be desirable to divide the operation into a plurality of quantitatively measurable tasks that only differ from each other based upon the location of their beginning and end locations.

Still further, the systems described herein may be applicable other types of machines that engage material at a work site such as rotary mining drills and compactors. For example, a rotary mining drill may perform a plurality of operations as part of a drilling process with each operation being divisible into a plurality of quantitatively measurable tasks. Such operations may include locating the machine at the desired location, levelling the machine to correctly to position the drill at the desired orientation and in the desired location, operating the drill bit at the desired rotational and feed speeds.

Even further, although described above with respect to machines that perform material moving operations or otherwise engage material, the systems described herein may also be applicable other types of machines. For example, the operation of a utility truck having a lift may include a plurality of operations that may be divided into a plurality of quantitatively measurable tasks. These operations may include raising the lift without properly levelling and/or securing the truck, moving the truck without the lift being properly secured, and overloading the man lift. In another example, a bus may perform operations that may be divided into quantitatively measurable tasks such as moving before the door is fully closed, opening the door while still in motion, reversing in a designated high-pedestrian area, and making a turn at a rate of speed that exceeds a threshold. Other repetitive quantitatively measurable operations are contemplated.

Figure 17:
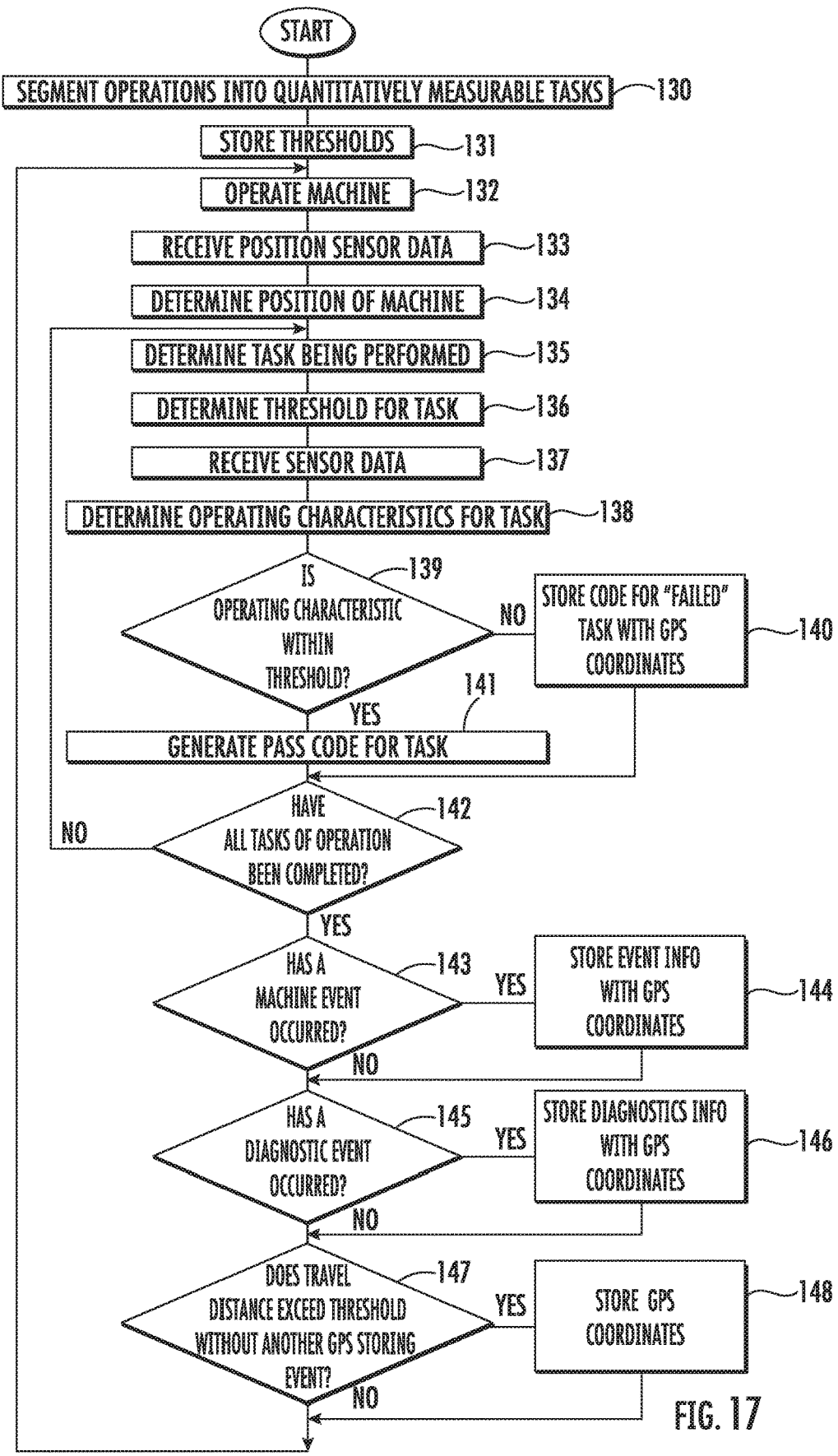
FIG. 17 depicts a flowchart illustrating a machine operation coaching system.

FIG. 17 illustrates a flowchart of the operation of the machine operation coaching system 50 for evaluating or rating the performance of a plurality of operations and generating a map displaying operations that do not reach a desired level of performance. At stage 130, each of the operations to be performed by a machine 10 such as the wheel loader 11 or the articulated truck 60 may be segmented or broken into a plurality of quantitatively measurable tasks and the tasks stored within the controller 41, 77. A threshold or operating range for each task may be stored within controller 41, 77 at stage 131. In addition, thresholds or operating ranges corresponding to machine events may also be stored at stage 131.

At stage 132, the operator may operate the machine 10 by moving about the work site 100 and performing various operations. The controller 41, 77 may receive position data from the position sensor 43, 80 at stage 133. At stage 134, the controller 41, 77 may determine the position of the machine 10 at the work site 100 based upon the position data.

The controller 41, 77 may determine at stage 135 the task being performed as part of a desired operation. The controller 41 may determine the task being performed at stage 135 based upon the previously performed task or may determine that the task being performed based upon the data received from the various sensors together with the sequence of operation of the various machine components. Upon determining the task being performed, the controller 41, 77 may determine or access from memory of the controller 41, 77 at stage 136 the threshold or operating range for the particular task.

The controller 41, 77 may receive at stage 137 data from the sensors of the machine 10. At stage 138, the controller 41, 77 may determine the operating characteristic or characteristics for the task being performed. For example, if the machine is beginning a bucket loading process as described above with respect to FIGS. 5-6, the controller 41, 77 may determine the articulation angle 112 between the base portion 12 and the implement support portion 13. At decision stage 139, the controller 41, 77 may compare the relevant operating characteristics to the applicable threshold or operating range to determine whether the performance of the task is within the desired threshold or operating range (i.e., was properly performed). If the operating characteristics do not meet the threshold or are not within the desired operating range, at stage 140 a fail code may be generated and stored within the controller 41, 77 together with the position or GPS coordinates of the machine 10. If the operating characteristics are within the desired threshold or operating range, a pass code may be generated at stage 141. In some instances, the pass code together with the position or GPS coordinates of the machine 10 may be stored within the controller 41, 77.

At stage 142, the controller 41, 77 may determine whether the completed task was the last task of the operation. If the completed task was not the last task of the operation, the operation has not been completed and the operator may continue to perform tasks to complete the operation and stages 135-142 repeated.

At decision stage 143, the controller 41, 77 may determine whether a machine event has occurred. If a machine event has occurred, the machine event information may be stored within the controller 41, 77 at stage 144 together with the position or GPS coordinates of the machine 10 at the time of the machine event.

At decision stage 145, the controller 41, 77 may determine whether a machine diagnostics event has occurred. If a machine diagnostics event has occurred, the machine event information may be stored within the controller 41, 77 at stage 146 together with the position or GPS coordinates of the machine 10 at the time of the machine diagnostics event.

At decision stage 147, the controller 41, 77 may determine whether the distance traveled by the machine 10 exceeds a threshold without the position or GPS coordinates of the machine having been stored at any of stages 140, 144, or 146. If the distance has been exceeded without storing the position or GPS coordinates, the current position or GPS coordinates of the machine may be stored at stage 148.

The processes of stages 132-148 may be repeated as desired. At any time an operator may terminate the machine operation and display the closed loop path 105 and the corresponding operator performance. In addition, the operator may observe instructional information at that time.

INDUSTRIAL APPLICABILITY

The industrial applicability of the system described herein will be readily appreciated from the forgoing discussion. The foregoing discussion is applicable to machines 10 that are operated at a work site 100 to perform various operations along a closed loop path 105 that may be segmented into one or more quantitatively measurable tasks. Such system may be used at a mining site, a landfill, a quarry, a construction site, a roadwork site, a forest, a farm, or any other area in which machine operation is desired.

Machine operators often perform repetitive operations at a work site 100 such as to move material from one location to another. Some of the operations may be segmented or broken into one or more quantitatively measurable tasks. For example, some of the tasks may involve moving a machine or components of the machine (e.g., base portion 12, implement support portion 13, lift arms 21, and/or bucket 24) in a specified manner such as with the components positioned in a desired manner or moving at a desired rate. The performance of an operator may be evaluated by comparing the position and movement of the machine and its components to theoretical or desired positions and movements. Thresholds or operating ranges relative to the theoretical or desired positions and movements may be established and tasks that are performed within a desired threshold or operating range judged or evaluated as good or passing and performance outside of the thresholds judged as poor or failing. The performance of the individual tasks may then be used to evaluate the overall performance of an operation.

Each time an operator fails a task, the position or GPS coordinates of the machine 10 may be saved or stored within the controller 41, 77. The position or GPS coordinates of the machine may also be saved upon the occurrence of a machine event or a machine diagnostics event. Further, if the machine 10 has traveled a distance that exceeds a threshold without otherwise saving the position or GPS coordinates, the current position or GPS coordinates may be saved within the controller 41, 77 to improve the accuracy of the closed loop path 105 traveled by the machine.

Feedback may be provided to the operator by displaying the closed loop path 105 together with the failed tasks and their associated position or GPS coordinates. In addition, on-board instructional materials such as video, animations, and suggestions may be displayed so that an operator may receive instruction while in the working environment.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for generating a map based upon a plurality of operations performed by a machine, each operation including at least one quantitatively measurable task, the system comprising:
a ground engaging drive mechanism operatively connected to the machine to propel the machine about a path;
an operating sensor operatively associated with the machine and configured to determine a first operating characteristic of the machine;
a position sensor operatively associated with the machine and configured to determine a position of the machine;
a visual image display device; and
a controller configured to:
store a first operating range for a first quantitatively measurable task of an operation;
store a second operating range for a second quantitatively measurable task of the operation;
determine a current machine position of the machine based upon an output of the position sensor;
determine the first operating characteristic of the machine based upon an output of the operating sensor as the machine is propelled about the path to perform operations;
compare the first operating characteristic to the first operating range;
store an identification of a first failed task together with the current machine position upon the first operating characteristic of the machine being outside of the first operating range;
determine a second operating characteristic of the machine based upon the output of the operating sensor as the machine is propelled about the path to perform the operations;
compare the second operating characteristic to the second operating range;
store an identification of a second failed task together with the current machine position upon the second operating characteristic of the machine being outside of the second operating range; and
generate and display a map of the path of the machine on the visual image display device, the map including each failed task and its associated machine position while performing the failed task.

2. The system of claim 1, further including a linkage member operatively connected to a work implement for moving material.

3. The system of claim 2, wherein the first operating characteristic is a position of the linkage member relative to the work implement.

4. The system of claim 2, wherein the first operating characteristic is an angular velocity of the linkage member relative to the work implement.

5. The system of claim 2, wherein the linkage member is a first linkage member and further comprising a second linkage member, the first linkage member being pivotable relative to the second linkage member, and the work implement being operatively connected to one of the first linkage member and the second linkage member.

6. The system of claim 5, wherein the work implement is pivotally mounted on one of the first linkage member and the second linkage member.

7. The system of claim 2, further including a base portion and an implement support portion pivotally mounted to the base portion, the linkage member being pivotally mounted on the implement support portion.

8. The system of claim 1, wherein the controller is further configured to:
 access a range of machine operation;
 determine whether the machine is operating outside of the range of machine operation; and
 store details of a machine operation that is outside of the range of machine operation together with the current machine position upon the machine operating outside of the range of machine operation.

9. The system of claim 8, wherein the controller is further configured to:
 determine whether a machine diagnostics event has occurred; and
 store details of the machine diagnostics event together with the current machine position upon a machine diagnostics code being generated.

10. The system of claim 1, wherein the controller is further configured to:
 access a travel distance threshold; and
 store the current machine position upon the machine traveling a distance exceeding the travel distance threshold without otherwise storing the current machine position of the machine.

11. The system of claim 1, wherein the path is a closed loop path.

12. The system of claim 1, wherein the controller is further configured to display instructional materials corresponding to each failed task.

13. The system of claim 12, wherein the controller is further configured to display the instructional materials on the visual image display device.

14. The system of claim 1, wherein the second operating characteristic is a gear in which a transmission of the machine is operating.

15. A method of generating a map based upon a plurality of operations performed by a machine, each operation including at least one quantitatively measurable task, the method comprising:
 storing a first operating range for a first quantitatively measurable task of an operation;
 storing a second operating range for a second quantitatively measurable task of the operation;
 determining a current machine position of the machine based upon an output of a position sensor operatively associated with the machine;
 determining a first operating characteristic of the machine based upon an output of an operating sensor operatively associated with the machine as the machine is propelled about a path by a ground engaging drive mechanism operatively connected to the machine to perform operations;
 comparing the first operating characteristic to the first operating range;
 storing an identification of a first failed task together with the current machine position upon the first operating characteristic of the machine being outside of the first operating range;
 determining a second operating characteristic of the machine based upon an output of the operating sensor as the machine is propelled about the path to perform the operations;
 comparing the second operating characteristic to the second operating range;
 storing an identification of a second failed task together with the current machine position upon the second operating characteristic of the machine being outside of the second operating range; and
 generating and displaying a map of the path of the machine on a visual image display device, the map including each failed task and its associated machine position while performing the failed task.

16. The method of claim 15, further comprising:
 accessing a range of machine operation;
 determining whether the machine is operating outside of the range of machine operation; and
 storing details of a machine operation that is outside of the range of machine operation together with the current machine position upon the machine operating outside of the range of machine operation.

17. The method of claim 16, further comprising:
 determining whether a machine diagnostics event has occurred; and
 storing details of the machine diagnostics event together with the current machine position upon a machine diagnostics code being generated.

18. The method of claim 17, further comprising:
 accessing a travel distance threshold; and
 storing the current machine position upon the machine traveling a distance exceeding the travel distance threshold without otherwise storing the current machine position of the machine.

19. The method of claim 18, wherein the path is a closed loop path.

20. A machine comprising:
 a ground engaging drive mechanism operatively associated with the machine and configured to propel the machine about a path;
 an operating sensor operatively associated with the machine and configured to determine a first operating characteristic of the machine;
 a position sensor operatively associated with the machine and configured to determine a position of the machine;
 a visual image display device; and
 a controller configured to:
  store a first operating range for a first quantitatively measurable task of an operation;
  store a second operating range for a second quantitatively measurable task of the operation;
  determine a current machine position of the machine based upon an output of the position sensor;
  determine the first operating characteristic of the machine based upon an output of the operating sensor as the machine is propelled about the path to perform operations;
  compare the first operating characteristic to the first operating range;
  store an identification of a first failed task together with the current machine position upon the first operating characteristic of the machine being outside of the first operating range;
  determine a second operating characteristic of the machine based upon the output of the operating sensor as the machine is propelled about the path to perform the operations;
  compare the second operating characteristic to the second operating range;
  store an identification of a second failed task together with the current machine position upon the second operating characteristic of the machine being outside of the second operating range; and generate and display a map of the path of the machine on a visual image display device, the map including each failed task and its associated machine position while performing the failed task.

\* \* \* \* \*